US012472827B2

(12) United States Patent
Sujan et al.

(10) Patent No.: US 12,472,827 B2
(45) Date of Patent: Nov. 18, 2025

(54) METHODS AND SYSTEMS FOR CONTROLLING MULTIPLE ELECTRIC AXLES

(71) Applicant: Cummins Inc., Columbus, IN (US)

(72) Inventors: Vivek Anand Sujan, Columbus, IN (US); Jenni Lyn Muncie-Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 173 days.

(21) Appl. No.: 18/274,432

(22) PCT Filed: Feb. 17, 2021

(86) PCT No.: PCT/US2021/018287
§ 371 (c)(1),
(2) Date: Jul. 26, 2023

(87) PCT Pub. No.: WO2022/177550
PCT Pub. Date: Aug. 25, 2022

(65) Prior Publication Data
US 2024/0109423 A1    Apr. 4, 2024

(51) Int. Cl.
*B60L 3/10*    (2006.01)
*B60L 15/20*   (2006.01)

(52) U.S. Cl.
CPC .............. *B60L 3/102* (2013.01); *B60L 3/106* (2013.01); *B60L 15/2036* (2013.01);
(Continued)

(58) Field of Classification Search
CPC ... B60K 6/52; B60L 15/2009; B60L 15/2036; B60L 15/2045; B60L 2220/42;
(Continued)

(56) References Cited

U.S. PATENT DOCUMENTS 8,448,730 B2    5/2013    Muller
9,067,484 B2    6/2015    Zhao
(Continued)

FOREIGN PATENT DOCUMENTS

WO    201206055 A2    1/2012
WO    2018107256 A1   6/2018
(Continued)

OTHER PUBLICATIONS

International Preliminary Report on Patentability received for PCT Patent Application No. PCT/US2021/018287, mailed on Aug. 31, 2023, 6 pages.
(Continued)

*Primary Examiner* — Tyler J Lee
(74) *Attorney, Agent, or Firm* — Faegre Drinker Biddle & Reath LLP

(57) ABSTRACT

A system for controlling a plurality of electric axles of a vehicle is disclosed, comprising: the plurality of electric axles, one or more motor generators associated with one or more of the plurality of electric axles, and a multi-axle controller communicatively coupled to the one or more motor generators and configured to execute software to cause the multi-axle controller to: determine a power demand of the vehicle based at least in part on one or more parameters of each electric axle and current and/or future road grade; generate a performance cost function associated with one or more performance metrics, the power demand, and/or the vehicle information; determine a power distribution among the plurality of electric axles by optimizing the performance cost function; and transmit a traction command to the one or more motor generators to control the operation of the plurality of electric axles.

17 Claims, 7 Drawing Sheets

(52) U.S. Cl.
CPC ....... *B60L 15/2045* (2013.01); *B60L 2220/42* (2013.01); *B60L 2240/26* (2013.01); *B60L 2240/423* (2013.01); *B60L 2240/642* (2013.01)

(58) Field of Classification Search
CPC ............ B60L 2240/14; B60L 2240/16; B60L 2240/26; B60W 2720/40; B60W 30/188
See application file for complete search history.

(56) References Cited

U.S. PATENT DOCUMENTS

| | | | |
|---|---|---|---|
| 11,767,008 B2 * | 9/2023 | Jin | B60T 13/662 |
| | | | 180/282 |
| 2011/0166735 A1 * | 7/2011 | Kustosch | B60L 58/12 |
| | | | 701/99 |
| 2011/0257826 A1 | 10/2011 | Yu | |
| 2017/0361842 A1 | 12/2017 | Livshiz et al. | |
| 2018/0093655 A1 | 4/2018 | Healy et al. | |
| 2021/0221354 A1 * | 7/2021 | Jin | B60T 8/243 |

FOREIGN PATENT DOCUMENTS

| | | | |
|---|---|---|---|
| WO | 2019200389 A1 | 10/2019 | |
| WO | 2020169919 A1 | 8/2020 | |

OTHER PUBLICATIONS

International Search Report and Written Opinion for International patent application No. PCT/US2021/018287, filed Feb. 17, 2021, mailed Apr. 28, 2021.

* cited by examiner

METHODS AND SYSTEMS FOR CONTROLLING MULTIPLE ELECTRIC AXLES

CROSS-REFERENCE TO RELATED APPLICATIONS

This application claims priority to and is a U.S. national stage application of International Patent Application No. PCT/US2021/018287, filed Feb. 17, 2021, the entire disclosure of which being expressly incorporated herein by its reference.

FIELD

Disclosed embodiments relate generally to methods and systems for controlling axles of a vehicle, and more particularly to methods and systems for controlling multiple electric axles of a vehicle.

BACKGROUND

Various types of organizations like transit authorities maintain and operate fleets of electric vehicle. Generally, these vehicles have multiple axles and multiple motor generators. In a multiple axle vehicle, pressure of ground contact of each wheel (e.g., tractive effort) may be reduced by distributing the mass of the vehicle to the multiple axles. As such, it is desirable to provide a method and system which provides a real-time control of multiple axle system to optimize traction efforts.

SUMMARY

According to one embodiment, the present disclosure provides a system for controlling a plurality of electric axles of a vehicle. The system includes the plurality of electric axles, one or more motor generators associated with one or more of the plurality of electric axles, and a multi-axle controller communicatively coupled to the one or more motor generators. The multi-axle controller is configured to execute software to cause the multi-axle controller to determine a power distribution among the plurality of electric axles by optimizing a performance cost function and transmit a traction command to the one or more motor generators to control the operation of the plurality of electric axles.

In some embodiments, the multi-axle controller may be further configured to execute software to cause the multi-axle controller to: determine one or more parameters of each electric axle of the plurality of electric axles of the vehicle, the one or more parameters indicating capabilities of each electric axle, determine current and/or future road grade based at least in part on grade sensor data collected by the vehicle and/or other vehicles and/or navigation system data of a route that the vehicle is travelling, determine a power demand of the vehicle based at least in part on one or more parameters of each electric axle and current and/or future road grade, and generate a performance cost function associated with one or more performance metrics, the power demand, and/or the vehicle information.

In some embodiments, the one or more vehicle parameters may include a location of each electric axle, a motor generator speed profile of each electric axle, a motor generator torque profile of each electric axle, a motor generator efficiency map of each electric axle, a torque, speed, and/or power limit of each motor generator, a gearing ratio or transmission ratio of each electric axle, a rear axle ratio of each electric axle, and/or inertia characteristics of each electric axle.

In some embodiments, the one or more performance metrics may include reducing a total energy consumption of the vehicle, increasing a slip safety margin, increasing a transient torque margin, and increasing power margin.

In some embodiments, the multi-axle controller may be further configured to execute software to cause the multi-axle controller to determine vehicle information of the vehicle. The vehicle information may include a total mass of the vehicle, a center of gravity, a load distribution among the plurality of electric axles, and/or a traction limit of each electric axle.

In some embodiments, to generate the performance cost function may include to generate the performance cost function associated with one or more performance metrics based at least in part on the one or more parameters of each electric axle, the current and/or future road grade, the power demand, and/or the vehicle information.

In some embodiments, to determine the vehicle information may include to: determine a total mass of the vehicle and a center of gravity based at least in part on acceleration and acceleration force of the vehicle, determine a load distribution among the plurality of electric axles based at least in part on a location of each electric axle, the total mass of the vehicle, and the center of gravity, and determine a traction limit of each electric axle based at least in part on the total mass of the vehicle, the center of gravity, the load distribution, and/or the current or future road grade, the traction limit indicating a maximum motor torque that can be applied to the respective electric axle before wheel slip is detected.

In some embodiments, to determine the power distribution among the plurality of electric axles may include to: determine a torque or power requirement for each electric axle to reduce performance cost function within the capability and a traction limit of the axle parameters, and determine an optimal load of each motor generator that satisfies the power demand and the performance cost function based at least in part on the torque or power requirement for each electric axle.

In some embodiments, to determine the power distribution among the plurality of electric axles may include to: determine whether to engage a lift and/or slide axle and/or re-pressurize air bags to shift a center of gravity of the vehicle to further optimize the performance cost function, update, in response to a determination that the lift and/or slide axle is to be engaged and/or the air bags are to be re-pressurized, the one or more parameters of each electric axle indicating updated capabilities of the respective electric axle that has been lifted, slid, or otherwise altered, determine the torque or power requirement for each electric axle to reduce optimized performance cost function within capability and a traction limit of the updated axle parameters, and determine an optimal load of each motor generator that satisfies the power demand and the performance cost function based at least in part on the torque or power requirement for each electric axle.

According to another embodiment, the present disclosure provides a method for controlling a plurality of electric axles of a vehicle. The method includes determining a power distribution among the plurality of electric axles by optimizing the performance cost function and transmitting a traction command to one or more motor generators coupled to the plurality of electric axles to control operation of the plurality of electric axles.

In some embodiments, the method may further include determining one or more parameters of each electric axle of the plurality of electric axles of the vehicle, the one or more parameters indicating capabilities of each electric axle, determining current and/or future road grade based at least in part on grade sensor data collected by the vehicle and/or other vehicles and/or navigation system data of a route that the vehicle is travelling, determining a power demand of the vehicle based at least in part on one or more parameters of each electric axle and current and/or future road grade, and generating a performance cost function associated with one or more performance metrics.

In some embodiments, the one or more vehicle parameters may include a location of each electric axle, a motor generator speed profile of each electric axle, a motor generator torque profile of each electric axle, a motor generator efficiency map of each electric axle, a torque, speed, and/or power limit of each motor generator, a gearing ratio or transmission ratio of each electric axle, a rear axle ratio of each electric axle, and/or inertia characteristics of each electric axle.

In some embodiments, the one or more performance metrics may include reducing a total energy consumption of the vehicle, increasing a slip safety margin, increasing a transient torque margin, and increasing power margin.

In some embodiments, the method may further include determining vehicle information of the vehicle, wherein the vehicle information includes a total mass of the vehicle, a center of gravity, a load distribution among the plurality of electric axles, and/or a traction limit of each electric axle.

In some embodiments, generating the performance cost function may include generating the performance cost function associated with one or more performance metrics based at least in part on the one or more parameters of each electric axle, the current and/or future road grade, the power demand, and/or the vehicle information.

In some embodiments, determining the vehicle information may include: determining a total mass of the vehicle and a center of gravity based at least in part on acceleration and acceleration force of the vehicle, determining a load distribution among the plurality of electric axles based at least in part on a location of each electric axle, the total mass of the vehicle, and the center of gravity, and determining a traction limit of each electric axle based at least in part on the total mass of the vehicle, the center of gravity, the load distribution, and/or the current or future road grade, the traction limit indicating a maximum motor torque that can be applied to the respective electric axle before wheel slip is detected.

In some embodiments, determining the power distribution among the plurality of electric axles may include: determining a torque or power requirement for each electric axle to reduce performance cost function within capability and a traction limit of the axle parameters, and determining an optimal load of each motor generator that satisfies the power demand and the performance cost function based at least in part on the torque or power requirement for each electric axle.

In some embodiments, determining the power distribution among the plurality of electric axles may further include: determining whether to engage a lift and/or slide axle and/or re-pressurize air bags to shift a center of gravity of the vehicle to further optimize the performance cost function, updating, in response to determining that the lift and/or slide axle is to be engaged and/or the air bags are to be re-pressurized, the one or more parameters of each electric axle indicating updated capabilities of the respective electric axle that has been lifted, slid, or otherwise altered, determining the torque or power requirement for each electric axle to reduce optimized performance cost function within capability and a traction limit of the updated axle parameters, and determining an optimal load of each motor generator that satisfies the power demand and the performance cost function based at least in part on the torque or power requirement for each electric axle.

According to another embodiment, the present disclosure provides a multi-axle controller for controlling a plurality of electric axles of a vehicle. The multi-axle controller includes a processor and a memory. The memory is configured to store software which when executed by the processor causes the processor to: determine a power demand of the vehicle based at least in part on one or more parameters of each electric axle and current and/or future road grade, generate a performance cost function associated with one or more performance metrics, the power demand, and/or the vehicle information, determine a power distribution among the plurality of electric axles by optimizing the performance cost function, and transmit a traction command to the one or more motor generators to control the operation of the plurality of electric axles.

In some embodiments, the processor may be further caused to: determine one or more parameters of each electric axle of the plurality of electric axles of the vehicle, the one or more parameters indicating capabilities of each electric axle, and determine current and/or future road grade based at least in part on grade sensor data collected by the vehicle and/or other vehicles and/or navigation system data of a route that the vehicle is travelling.

In some embodiments, to determine the power distribution among the plurality of electric axles includes to: determine a torque or power requirement for each electric axle to reduce performance cost function within capability and a traction limit of the axle parameters, and determine an optimal load of each motor generator that satisfies the power demand and the performance cost function based at least in part on the torque or power requirement for each electric axle.

In some embodiments, to determine the power distribution among the plurality of electric axles includes to: determine whether to engage a lift and/or slide axle and/or re-pressurize air bags to shift a center of gravity of the vehicle to further optimize the performance cost function, update, in response to a determination that the lift and/or slide axle is to be engaged and/or the air bags are to be re-pressurized, the one or more parameters of each electric axle indicating updated capabilities of the respective electric axle that has been lifted, slid, or otherwise altered, determine the torque or power requirement for each electric axle to reduce optimized performance cost function within capability and a traction limit of the updated axle parameters, and determine an optimal load of each motor generator that satisfies the power demand and the performance cost function based at least in part on the torque or power requirement for each electric axle.

It should be appreciated that in various embodiments the foregoing concepts, and additional concepts discussed below, may be arranged in any suitable combination. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
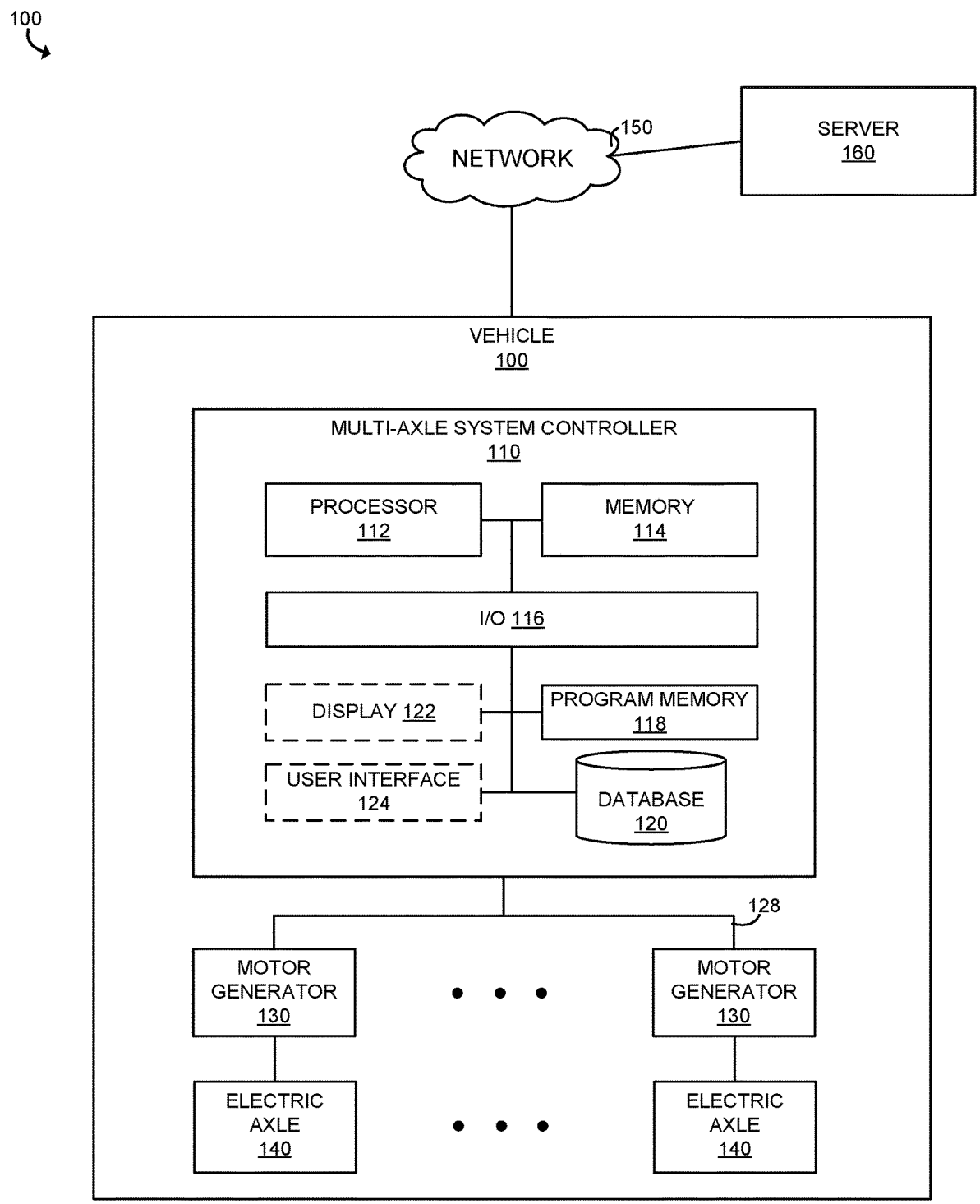
FIG. 1 is a block diagram illustrating an exemplary vehicle system according to an embodiment as disclosed herein.

FIG. 1 is a conceptual diagram of a vehicle having a multi-axle system for controlling multiple electric axles of the vehicle system. In the illustrative embodiment, the vehicle 100 includes a multi-axle system controller 110, one or more motor generators 130, and multiple electric axles 140. The multi-axle system controller 110 is communicatively coupled to the motor generators 130 to control the operations of the of multiple electric axles 140 of the vehicle system. In the illustrative embodiment, each motor generator 130 is associated with an electric axle 140 to control the operation of the electric axle 140. However, it should be understood that, in some embodiments, each motor generator may be associated with more than one electric axle. Although two motor generators 120 and two electric axles 130 are shown in FIG. 1, it should be understood that the number of motor generator 120 and electric axles 130 depicted is arbitrary, and any number of motor generator controllers and electric axles 130 could be used with the teachings of the present disclosure.

In operation, the multi-axle system controller 110 determines an optimal load distribution of motor generators 130 to satisfy one or more performance metrics and power demand of the vehicle system. The performance metrics include minimizing total energy consumption, maximizing wheel slip margins, maximizing torque margin in anticipation of tractive transient events, maximizing power margin in anticipation of regen events, and/or maximizing safety margins.

To do so, the multi-axle system controller 110 determines capabilities and/or characteristics of parameters of each axle in the vehicle system. The parameters of the axles include a location of each axle of the vehicle system including electrified and non-electrified axles, a motor generator torque or speed profile of each electric axle, a motor generator efficiency map of each electric axle, a gearing ratio or transmission ratio of each electric axle, a rear axle ratio of each electric axle, torque, speed, and/or power limits of each motor generator in the vehicle system, and/or inertia characteristics of each electric axle. Such parameters of each axle may be obtained by calibration or some form of direct measurement.

The multi-axle system controller 110 further identifies current and/or future road grade of a route that the vehicle 100 is travelling. The road grade includes characteristics of roads, including steepness, physical features, landform, road speed limits, and/or traffic lights and intersections along its route. The road grade is determined based on grade sensor data collected by the vehicle 100 and navigation data. Additionally or alternatively, in some embodiments, the grade sensor data may be collected by one or more other vehicles and/or a server (e.g., server 160) via a network such as the network 150. In such embodiments, the multi-axle system controller 110 may communicate with one or more servers 170 via the network 150 to obtain road/navigation information. The current road grade is then used to determine a total mass and a center of gravity of the present vehicle 100.

To determine the total mass of the vehicle, acceleration and acceleration force are determined. The acceleration is determined based on the observed velocity of each axle assuming that all wheels are rotating at the same rate (e.g., no slip condition). The acceleration force is determined based on imposed torque at each wheel while accounting for the torque consumed due to aerodynamic drag, rolling resistance, grade/gravity effects, and torque losses from motor to wheels. These losses may be determined based on the capabilities and/or characteristics of parameters of each axle in the vehicle system and the current road grade. Based on the acceleration and acceleration force, the total mass of the vehicle is estimated.

Given the calibration of the location of the axles on the vehicle 100 and the total mass of the vehicle 100, a load distribution of the total mass of the vehicle on each axle is determined. In the illustrative embodiment, the load distribution on each axle may be determined by adjusting an assumed loading profile of the vehicle 100. For example, the assumed loading profile 100 is determined by assuming uniform loading of the total mass (e.g., uniform loading from front to back and/or side to side).

Based on the estimated total mass of the vehicle 100, the longitudinal center of gravity of the vehicle system, and the loadings on each electric axle, a control condition may be employed on a particular electric axle to determine a traction limit. For example, the multi-axle system controller 110 selects an electric axle that has a lowest normal force (e.g., a lowest load) and increases the torque until wheel slip occurs (i.e., when the force applied to the tires of the selected electric axle exceeds the traction available to those tires). The wheel slip is identified when the wheels of the selected electric axle spin at a rate higher than the other wheels in the vehicle system. In some embodiments, the vehicle slip may be identified by comparing a computed vehicle velocity of slipping wheels with a GPS measured vehicle velocity. If the computed vehicle velocity does not align with the GPS measured vehicle velocity, the vehicle slip is identified. When the wheel slip is detected on a given axle, the multi-axle system controller 110 identifies the upper limit of motor torque as a slip limit under current surface characterization (e.g., coefficients of rolling resistance) and available torque of the vehicle 100. In other words, by determining wheel slip on a given axle, a maximum torque that can applied to the wheels of the given electric axle is determined. As described further below, the slip limit is associated with safety margins.

The multi-axle system controller 110 further determines how much power is needed at the wheels for either the current or future road grade of the route that the vehicle 100 is travelling based on measured, estimated, or otherwise known capabilities and/or characteristics vehicle parameters.

Based on the estimated load distribution on each of the axles, the traction limits, and the torque or power demand from the vehicle system, the multi-axle system controller 110 determines tractive effort out of each axle and transmit traction commands to the motor generators 130 to satisfy certain performance metrics. As described above, the performance metrics include minimizing total energy consumption, maximizing wheel slip margins, maximizing torque margin in anticipation of tractive transient events, maximizing power margin in anticipation of regen events, and/or maximizing safety margins.

To do so, the multi-axle system controller 110 generates one or more performance cost functions associated with one or more performance metrics. For example, a performance cost function may be constructed to minimize total energy consumption or maximize efficiency. In such example, based on the traction capability of each axle and the power demand of the vehicle system, the multi-axle system controller 110 may determine an optimal load distribution (e.g., how to split the power demand) among the motor generators 130 to provide the demanded power by optimizing the performance cost function. For example, the performance cost function may be optimized based on the current operating speed of each motor generator 130, the current or future power or torque demand by the vehicle system, the current load distribution among electric axles 140, and the slip limit of each motor generator 130. To determine an optimal load distribution, the multi-axle system controller 110 may determine an optimum torque that can be applied to each motor generator 130 while maximizing the slip safety margin to avoid a chance of wheel slip. In other words, this optimization of the performance cost function allows the multi-axle system controller 110 to split the power demand among the motor generators 130 to minimize the total energy consumption/maximize the efficiency while reducing the chance of wheel slip (i.e., maximizing the safety margins). In some embodiments, the multi-axle system controller 110 may have artificial intelligence capabilities that perform machine learning in generating and optimizing power cost functions associated with the performance metrics.

Figure 7A:
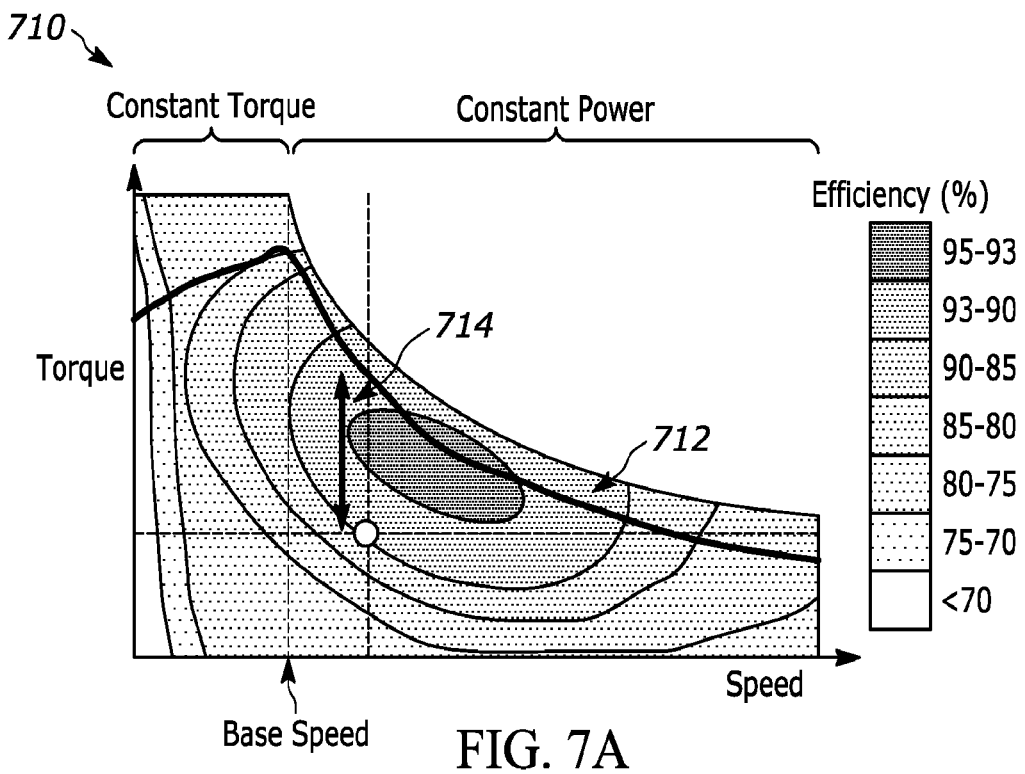
FIGS. 7A and 7B are graphs showing efficiency maps of motor generators of a vehicle according to the present disclosure.
Figure 7B:
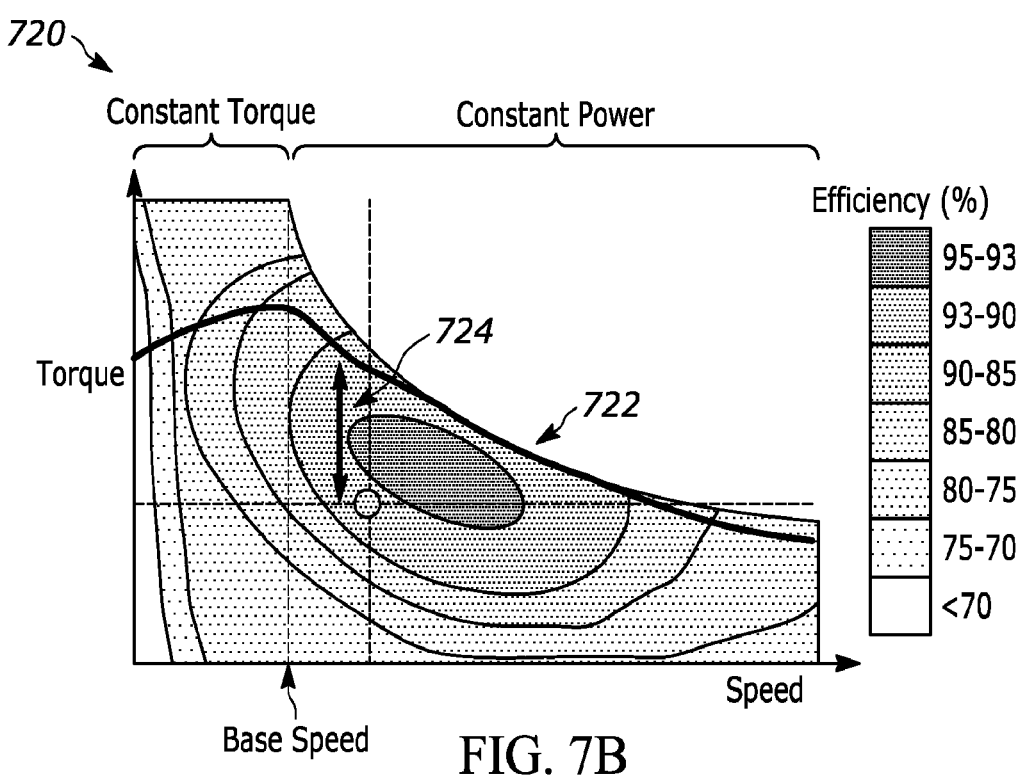

To provide an illustration of this example, and not to limit the disclosure in any way, exemplary efficiency maps for motor generators 710, 720 are shown in FIGS. 7A and 7B. The efficiency map for each motor generator illustrates the maximum efficiency for any speed and torque combination. In this example, the vehicle 100 has two motor generators 130 associated with multiple electric axles 140 of the vehicle system. For simplicity of illustration, each motor generator 130 is associated with one electric axle 140. However, it should be understood that, in some embodiments, the motor generator 130 may be associated with multiple electric axles 140. The performance cost function is optimized to select a point (i.e., a speed and torque combination) on each efficiency map such that the combination of two points provide the torque/power demand of the vehicle system at the given speed.

Additionally, in some embodiments, the performance cost function may be further optimized to provide an optimal load distribution. As shown in FIGS. 7A and 7B, the efficiency map for each motor generator 710, 720 further includes a slip limit plot for each motor generator 712, 722, which indicates the upper limit of motor torque that can be applied to the respective motor generator before one or more wheels of the electric axle 140 associated with the respective motor generator 130 slip. In other words, a vertical distance 714, 724 between a point (i.e., a speed and torque combination) and the slip limit plot 712, 722 on the efficiency map 710, 720 represents a safety margin for the respective motor generator 710, 720. The performance cost function is further optimized to select a point on each efficiency map as far away from the slip limit plot 712, 722 as possible while providing the torque/power demand of the vehicle system at the given speed. In other words, the performance cost function is optimized to maximize the safety margin and efficiency while providing the torque/power demand of the vehicle system.

In response to determining the optimal load distribution among the motor generators 130, the multi-axle system controller 110 communicates with the motor generators 130 to implement the load distribution among the motor generators.

It should also be understood that, in some embodiments, each motor generator may have its own motor generator controller that communicates with other motor generator controllers to control the multi-axle system of the vehicle.

In some embodiments, the vehicle 100 may be hybrid electric or all electric vehicles. Any of the variety of different types of known hybrid electric or all electric vehicles may be used with the teachings of the present disclosure. To provide an illustration of the concepts of the present disclosure, and not to limit the disclosure in any way, the systems and methods will primarily be described as applied to a vehicle having all electric axles. However, it should be understood that the concepts of the present disclosure apply to a vehicle that has one or more non-electrified axles in addition to one or more electric axles.

The multi-axle system controller 110 includes a processor 112 (e.g., a central processing unit (CPU), a graphics processing unit (GPU)), a memory 114 (e.g., random-access memory (RAM), read-only memory (ROM), flash memory), an input/output (I/O) controller 116 (e.g., a network transceiver), a memory unit 118, a optimization module 120, all of which may be interconnected via one or more address/data bus. In some embodiments, the multi-axle system controller 110 may further include a display 122 and/or a user interface 124 (e.g., a display screen, a touchscreen, a keyboard). It should be appreciated that although only one processor 112 is shown, the multi-axle system controller 110 may include multiple processors 112. Although the I/O controller 116 is shown as a single block, it should be appreciated that the I/O controller 116 may include a number of different types of I/O components.

The processor 112 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the multi-axle system controller 110) may be performed by one or more processors 112. The memory 114 may be a random-access memory (RAM), read-only memory (ROM), a flash memory, or any other suitable type of memory that enables storage of data such as instruction codes that the processor 112 needs to access in order to implement any method as disclosed herein.

A database 120, which may be a single database or a collection of two or more databases, is coupled to the multi-axle system controller 110. In the illustrative embodiment, the database 120 is part of the multi-axle system controller 110. In some embodiments, the multi-axle system controller 110 may access the database 120 via a network such as the network 150. The multi-axle system controller 110 may also include various software applications stored in the memory 118 and executable by the processor 112. These software applications may include specific programs, routines, or scripts for performing functions associated with the methods described herein. For example, a software application may be executed to generate and optimize one or more power cost functions. Additionally, the software applications may include general-purpose software applications for data processing, database management, data analysis, network communication, web server operation, or other functions described herein or typically performed by a vehicle system controller.

The network 150 is any suitable type of computer network that functionally couples at least one vehicle 100 with the server 160. The network 150 may include a proprietary network, a secure public internet, a virtual private network and/or one or more other types of networks, such as dedicated access lines, plain ordinary telephone lines, satellite links, cellular data networks, or combinations thereof. In embodiments where the network 150 comprises the Internet, data communications may take place over the network 150 via an Internet communication protocol.

The server 160 may be a single server or a plurality of servers. The server 160 may be any computing device that includes a processor (e.g., a microprocessor, a microcontroller), a memory, and an input/output (I/O) controller (e.g., a network transceiver).

As is further described below, the multi-axle system controller 110 controls the operation of the motor generators 120 over communication lines 112. It should be understood, however, that communication between multi-axle system controller 110 and motor generators 120 may alternatively, or in addition, be performed wirelessly.

It should be understood that, in some embodiments, the multi-axle system controller 110 may form a portion of a processing subsystem including one or more computing devices having non-transient computer readable storage media, processors or processing circuits, and communication hardware. The multi-axle system controller 110 may be a single device or a distributed device, and the functions of the controller may be performed by hardware and/or by processing instructions stored on non-transient machine-readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

Certain operations of multi-axle system controller 110 described herein include operations to interpret and/or to determine one or more parameters. Interpreting or determining, as utilized herein, includes receiving values by any method known in the art, including at least receiving values over communication lines 128, from a datalink, network communication or input device, receiving an electronic signal (e.g. a voltage, frequency, current, or pulse-width-modulation signal) indicative of the value, such as the SOC of a vehicle, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

Also, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices may be interconnected by one or more networks in any suitable form, including as a local area network, a controller area network, or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of the disclosure, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Figure 2:
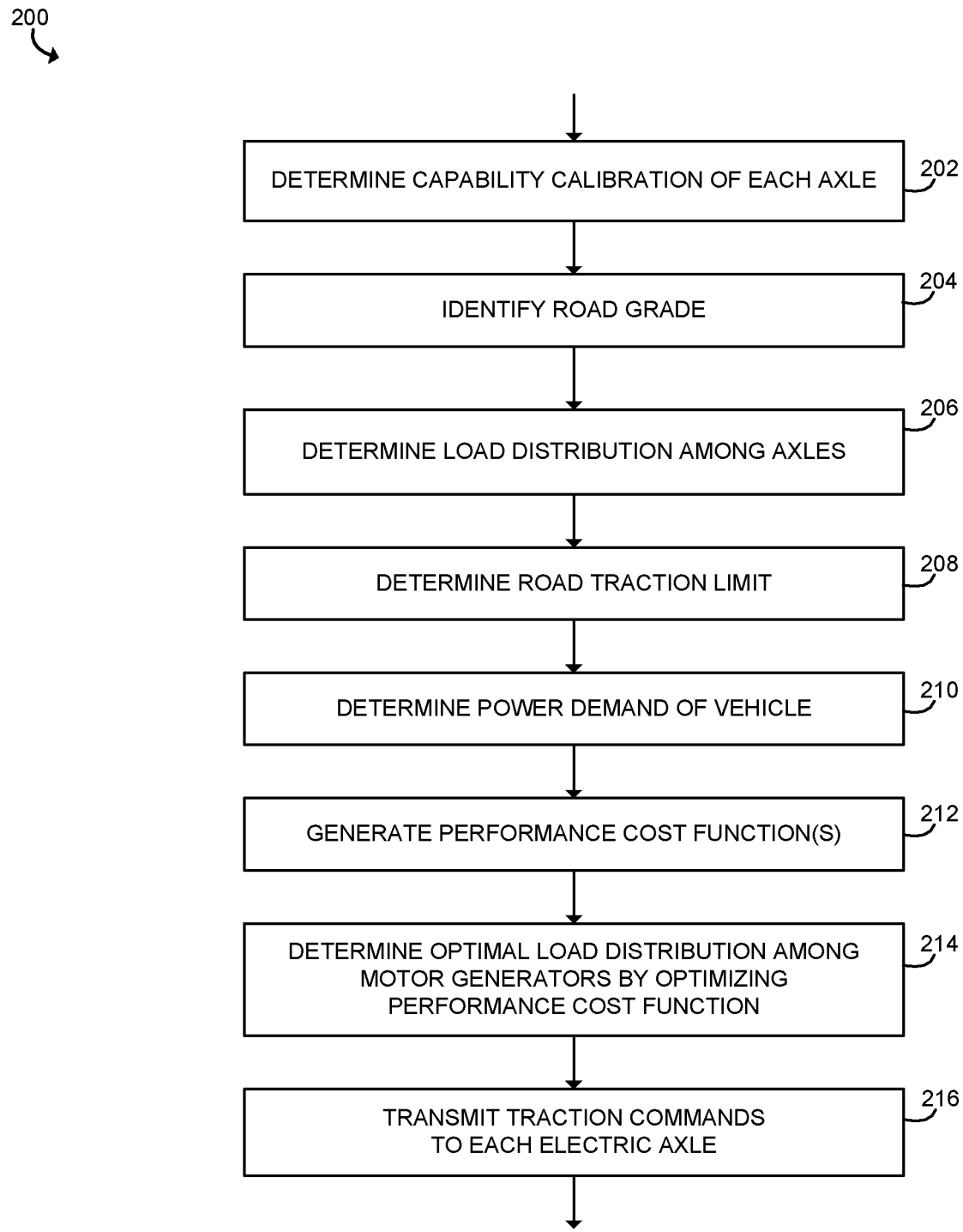
FIG. 2 is a flow chart depicting a method of controlling a plurality of electric axles of a vehicle according to the present disclosure.
Figure 3:
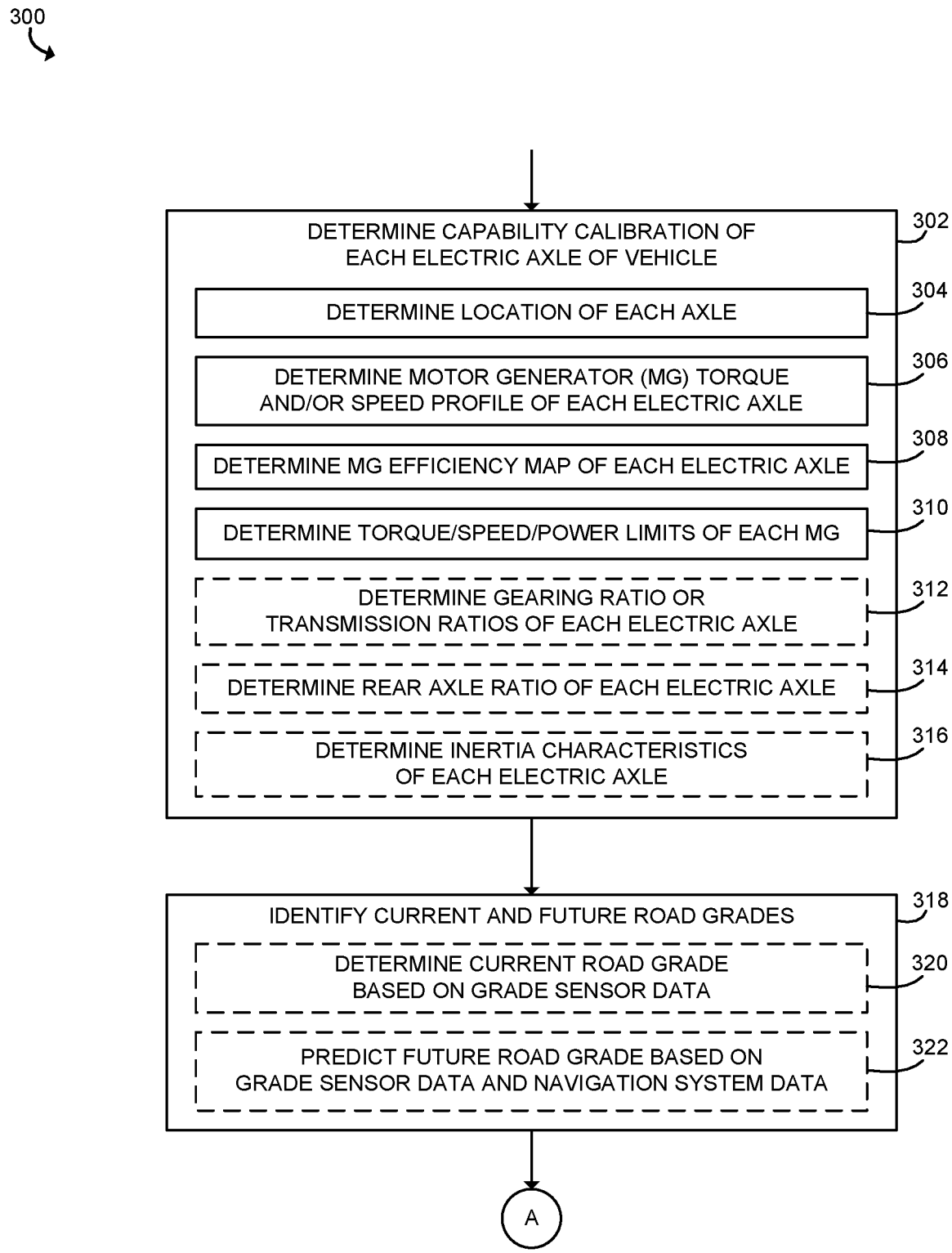
FIGS. 3-6 are a flow chart depicting a method of controlling a plurality of electric axles of a vehicle according to the present disclosure.

Referring now to FIG. 2, a high level method 200 for controlling a multiple axles of a vehicle to satisfy some performance metrics is shown. In the illustrative embodiment, the method 200 is performed by a multi-axle system controller (e.g., 110). In operation, the multi-axle system controller 110 determines an optimal load distribution of motor generators 130 to satisfy some performance metrics and the power demand of the vehicle system in real-time. The performance metrics include minimizing total energy consumption, maximizing wheel slip margins, maximizing torque margin in anticipation of tractive transient events, maximizing power margin in anticipation of regen events, and/or maximizing safety margins.

To do so, the method 200 begins at step 202 to determine capabilities and/or characteristics of parameters of each axle in the vehicle system. The parameters of the axles include a location of each axle of the vehicle system including electrified and non-electrified axles, a motor generator torque or speed profile of each electric axle, a motor generator efficiency map of each electric axle, a gearing ratio or transmission ratio of each electric axle, a rear axle ratio of each electric axle, torque, speed, and/or power limits of each motor generator in the vehicle system, and/or inertia characteristics of each electric axle. Such parameters of each axle may be obtained by calibration or some form of direct measurement.

At step 204, the multi-axle system controller 110 further identifies current and/or future road grade of a route that the vehicle 100 is travelling. The road grade includes characteristics of roads, including steepness, physical features, landform, road speed limits, and/or traffic lights and intersections along its route. The road grade is determined based on grade sensor data collected by the vehicle 100 and navigation data. Additionally or alternatively, in some embodiments, the grade sensor data may be collected by one or more other vehicles and/or a server (e.g., server 160) via a network such as the network 150. In such embodiments, the multi-axle system controller 110 may communicate with one or more servers 170 via the network 150 to obtain road/navigation information. As describe further below, the current road grade is then used to determine a total mass and a center of gravity of the present vehicle 100.

Subsequently, at step 206, the multi-axle system controller 110 determines a load distribution of the total mass of the vehicle on each axle based on the calibration of the location of the axles on the vehicle 100 and an estimated total mass of the vehicle 100. In the illustrative embodiment, the load distribution on each axle may be determined by adjusting an assumed loading profile of the vehicle 100. For example, the assumed loading profile 100 is determined by assuming uniform loading of the total mass (e.g., uniform loading from front to back and/or side to side).

At step 208, the multi-axle system controller 110 determines a traction limit based on the estimated total mass of the vehicle 100, the longitudinal center of gravity of the vehicle system, and the loadings on each electric axle. The traction limit indicates a maximum torque that can applied to the wheels of a given electric axle before wheel slip occurs. As described further below, the slip limit is associated with safety margins.

At step 210, the multi-axle system controller 110 further determines how much power is needed at the wheels for either the current or future road grade of the route that the vehicle 100 is travelling based on measured, estimated, or otherwise known capabilities and/or characteristics vehicle parameters.

Based on the estimated load distribution on each of the axles, the traction limits, and the torque or power demand from the vehicle system, the multi-axle system controller 110 determines tractive effort out of each axle and transmit traction commands to the motor generators 130 to satisfy certain performance metrics. As described above, the performance metrics include minimizing total energy consumption, maximizing wheel slip margins, maximizing torque margin in anticipation of tractive transient events, maximizing power margin in anticipation of regen events, and/or maximizing safety margins.

To do so, at step 212, the multi-axle system controller 110 generates one or more performance cost functions associated with one or more performance metrics. For example, a performance cost function may be constructed to minimize total energy consumption or maximize efficiency. In such example, based on the traction capability of each axle and the power demand of the vehicle system, the multi-axle system controller 110 may determine an optimal load distribution (e.g., how to split the power demand) among the motor generators 130 to provide the demanded power by optimizing the performance cost function. For example, the performance cost function may be optimized based on the current operating speed of each motor generator 130, the current or future power or torque demand by the vehicle system, the current load distribution among electric axles 140, and the slip limit of each motor generator 130.

At step 214, the multi-axle system controller 110 determines an optimal load distribution among the motor generators by optimizing the performance cost function. In the example above, the multi-axle system controller 110 may determine an optimum torque that can be applied to each motor generator 130 while maximizing the slip safety margin to avoid a chance of wheel slip. In other words, this optimization of the performance cost function allows the multi-axle system controller 110 to split the power demand among the motor generators 130 to minimize the total energy consumption/maximize the efficiency while reducing the chance of wheel slip (i.e., maximizing the safety margins). In some embodiments, the multi-axle system controller 110 may have artificial intelligence capabilities that perform machine learning in generating and optimizing power cost functions associated with the performance metrics.

At step 216, in response to determining the optimal load distribution among the motor generators 130, the multi-axle system controller 110 communicates with the motor generators 130 to implement the load distribution among the motor generators.

This flowchart is merely an example, which should not unduly limit the scope of the claims. One of ordinary skill in the art would recognize many variations, alternatives, and modifications.

Referring now to FIGS. 3-6, a computer-implemented method 300 for controlling a multiple axles of a vehicle to satisfy some performance metrics is shown. In the illustrative embodiment, the method 300 is performed by a multi-axle system controller (e.g., 110). In operation, the multi-axle system controller 110 determines an optimal load distribution of motor generators 130 to satisfy one or more performance metrics and the power demand of the vehicle system in real-time. The performance metrics include minimizing total energy consumption, maximizing wheel slip margins, maximizing torque margin in anticipation of tractive transient events, maximizing power margin in anticipation of regen events, and/or maximizing safety margins.

To do so, the method 300 begins at step 302 to determine capabilities and/or characteristics of parameters of each axle in the vehicle system. For example, the multi-axle system controller 110 determines a location of each axle of the vehicle system including electrified and non-electrified axles at step 304. Additionally or alternatively, the multi-axle system controller 110 determines a motor generator torque profile and/or a motor generator speed profile of each electric axle at step 306. Additionally or alternatively, at step 308, the multi-axle system controller 110 determines a motor generator efficiency map of each electric axle. Additionally or alternatively, the multi-axle system controller 110 determine torque, speed, and/or power limits of each motor generator in the vehicle system at step 310. Additionally or alternatively, at step 312, the multi-axle system controller 110 may determine a gearing ratio or transmission ratio of each electric axle. Additionally or alternatively, the multi-axle system controller 110 may determine a rear axle ratio of each electric axle at step 314. Additionally or alternatively, in step 316, the multi-axle system controller 110 may determine inertia characteristics of each electric axle. It should be understood that such parameters of each axle may be obtained by calibration or a form of direct measurement.

At step 318, the multi-axle system controller 110 further identifies current and/or future road grade of a route that the vehicle 100 is travelling. To do so, grade sensor data is collected by the vehicle 100 at step 320. It should be understood that the grade sensor data includes navigation data. The road grade includes characteristics of roads, including steepness, physical features, landform, road speed limits, and/or traffic lights and intersections along its route. In some embodiments, the grade sensor data may be collected by one or more other vehicles and/or a server (e.g., server 160) via a network such as the network 150. In such embodiments, the multi-axle system controller 110 may communicate with one or more servers 170 via the network 150 to obtain road/navigation information.

At step 322, the multi-axle system controller 110 determines the road grade based on the grade sensor data.

Figure 4:
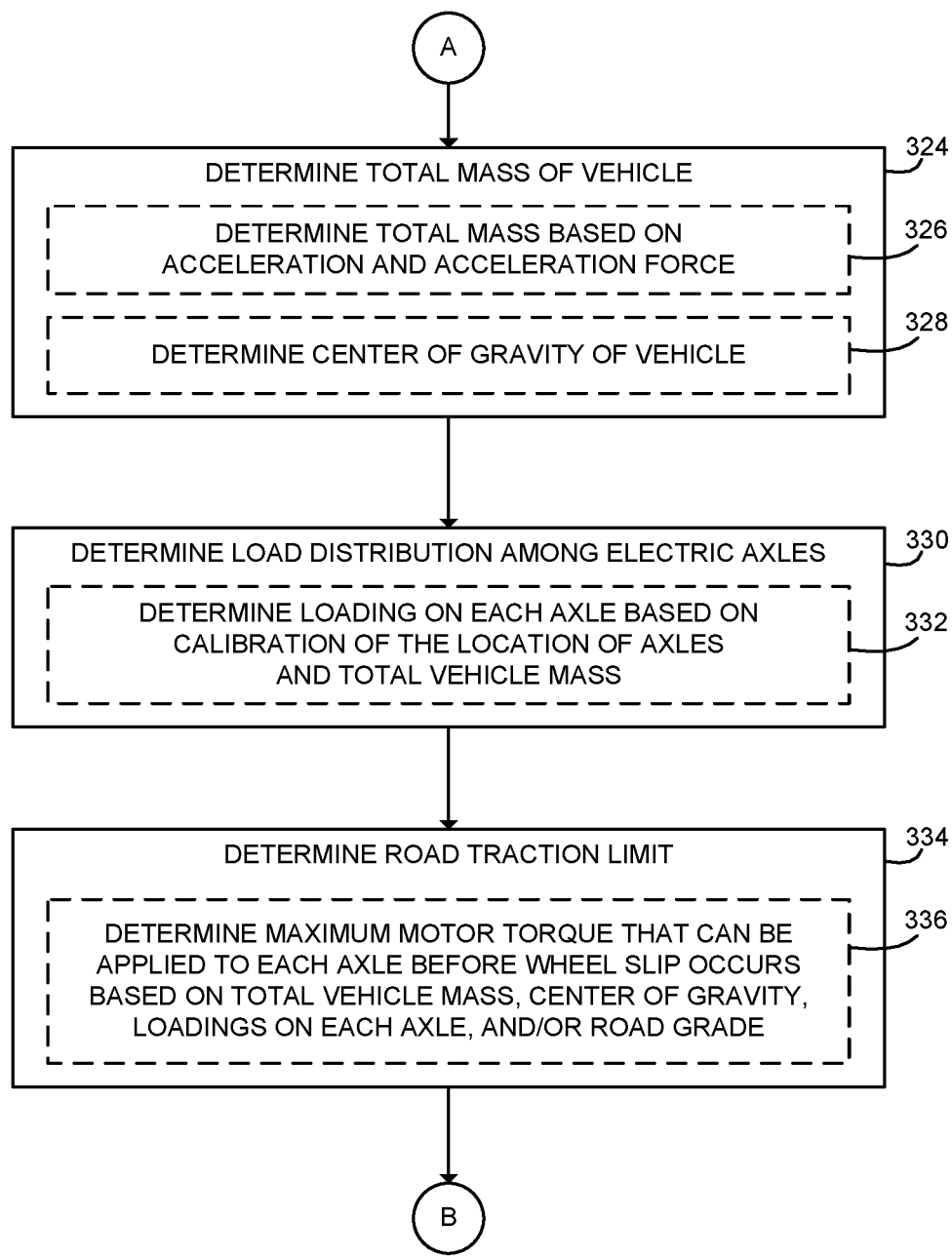

Subsequently, at step 324 shown in FIG. 4, the multi-axle system controller 110 determines the total mass of the vehicle. To do so, at step 326, the multi-axle system controller 110 further determines acceleration and acceleration force. The acceleration is determined based on the observed velocity of each axle assuming that all wheels are rotating at the same rate (e.g., no slip condition). The acceleration force is determined based on imposed torque at each wheel while accounting for the torque consumed due to aerodynamic drag, rolling resistance, grade/gravity effects, and torque losses from motor to wheels. These losses may be determined based on the capabilities and/or characteristics of parameters of each axle in the vehicle system and the current road grade. Based on the acceleration and acceleration force, the total mass of the vehicle is estimated. Additionally, the multi-axle system controller 110 determines the longitudinal center of gravity at step 328.

At step 330, given the calibration of the location of the axles on the vehicle 100 and the total mass of the vehicle 100, a load distribution of the total mass of the vehicle on each axle is determined. Specifically, at step 332, the multi-axle system controller 110 determines an amount of load on each axle based on calibration of the location of axles and total vehicle mass. The load distribution on each axle is determined by adjusting an assumed loading profile of the vehicle 100 based on the location of the axles and the total vehicle mass. For example, the assumed loading profile 100 is determined by assuming uniform loading of the total mass (e.g., uniform loading from front to back and/or side to side).

At step 334, the multi-axle system controller 110 determines a traction limit of each electric axle based on the estimated total mass of the vehicle 100, the longitudinal center of gravity of the vehicle system, and the loadings on each electric axle. For example, the multi-axle system controller 110 may select an electric axle that has a lowest normal force (e.g., a lowest load) and increase the torque until wheel slip occurs (i.e., when the force applied to the tires of the selected electric axle exceeds the traction available to those tires). The multi-axle system controller 110 detects a wheel slip when the wheels of the selected electric axle spin at a rate higher than the other wheels in the vehicle system. In some embodiments, the vehicle slip may be identified by comparing a computed vehicle velocity of slipping wheels with a GPS measured vehicle velocity. If the computed vehicle velocity does not align with the GPS measured vehicle velocity, the vehicle slip is identified. When the wheel slip is detected on a given axle, the multi-axle system controller 110 identifies the upper limit of motor torque as a slip limit under current surface characterization (e.g., coefficients of rolling resistance) and available torque of the vehicle 100. In other words, by determining wheel slip on a given axle, a maximum torque that can be applied to the wheels of the given electric axle is determined at step 336. As described further below, the slip limit is associated with safety margins.

Figure 5:
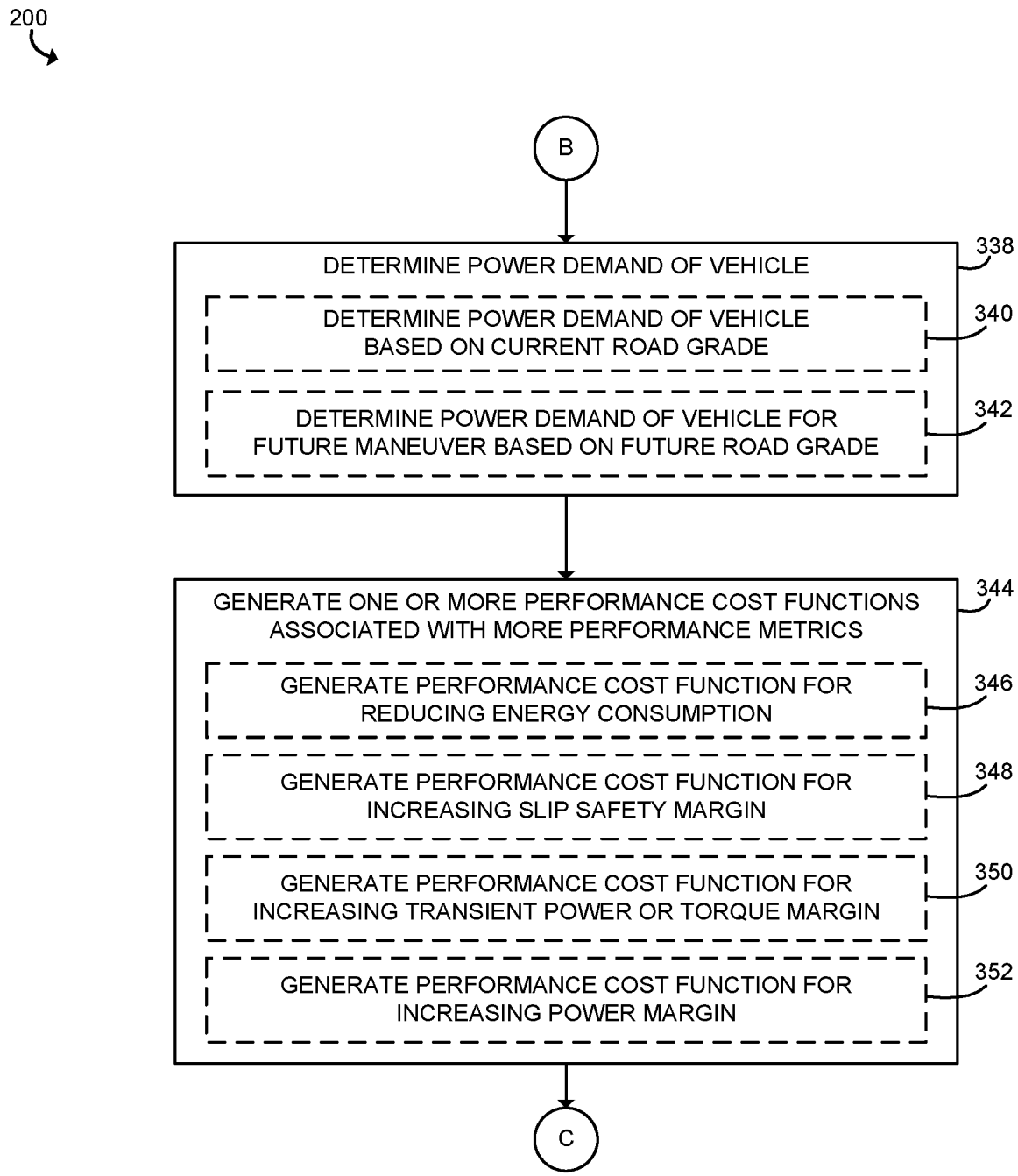
Figure 6:
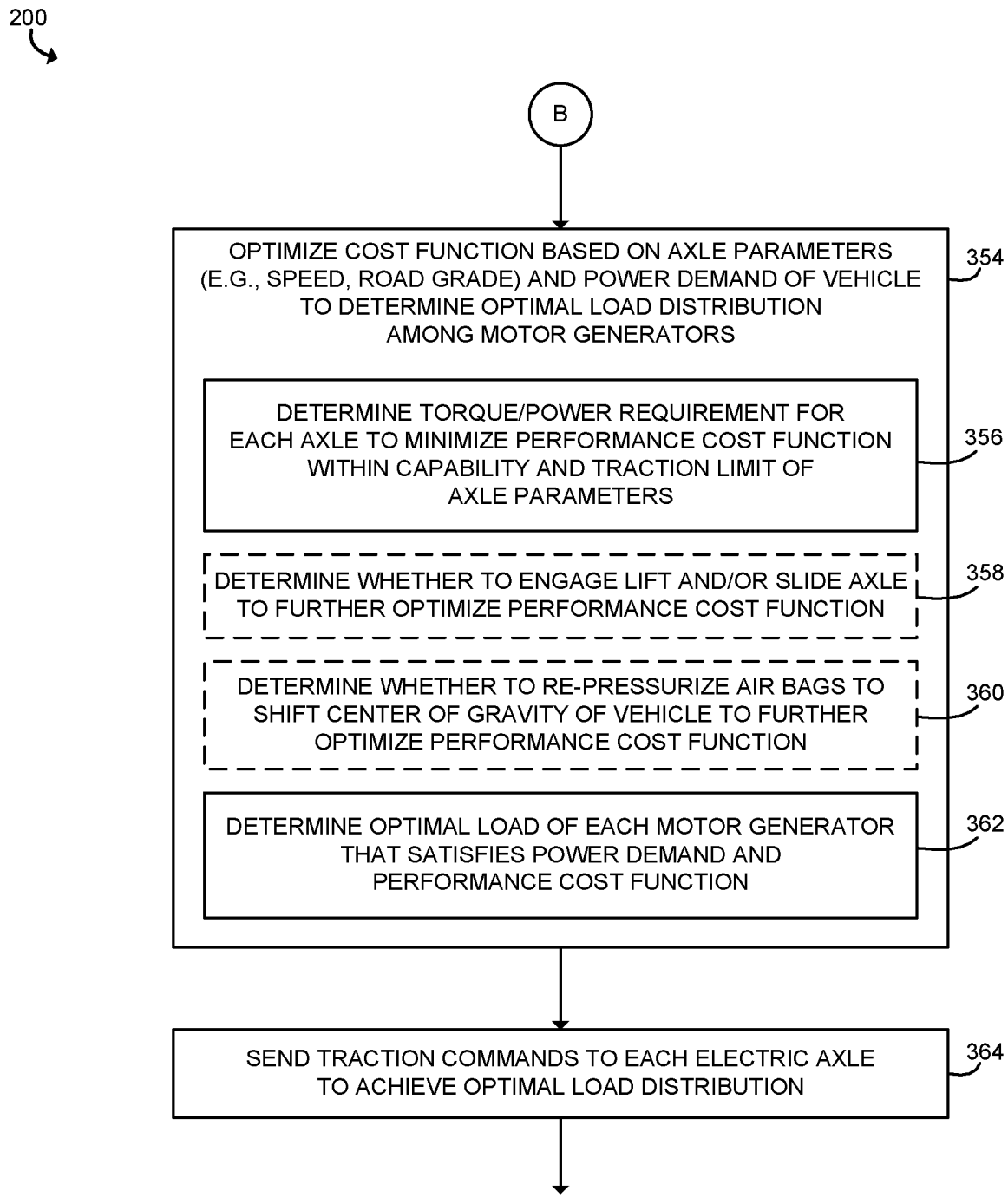

At step 338 of FIG. 5, the multi-axle system controller 110 further determines a power demand of the vehicle. To do so, at step 340, the multi-axle system controller 110 determines how much power is needed at the wheels for either the current road grade based on the measured, estimated, or otherwise known capabilities and/or characteristics vehicle parameters. Additionally, at step 342, the multi-axle system controller 110 determines how much power is needed at the wheels for either the future road grade of the route that the vehicle 100 is travelling based on the measured, estimated, or otherwise known capabilities and/or characteristics vehicle parameters.

Based on the estimated load distribution on each of the axles, the traction limits, and the torque or power demand from the vehicle system, the multi-axle system controller 110 determines tractive effort out of each axle and transmit traction commands to the motor generators 130 to satisfy certain performance metrics. As described above, the performance metrics include minimizing total energy consumption, maximizing wheel slip margins, maximizing torque margin in anticipation of tractive transient events, maximizing power margin in anticipation of regen events, and/or maximizing safety margins.

To do so, the multi-axle system controller 110 generates one or more performance cost functions associated with one or more performance metrics at step 344. For example, at step 346, the multi-axle system controller 110 may construct a performance cost function for minimizing total energy consumption or maximizing efficiency. Additionally or alternatively, the multi-axle system controller 110 may generate or optimize a performance cost function for increasing a slip safety margin at step 348. Additionally or alternatively, at step 350, the multi-axle system controller 110 may generate or optimize a performance cost function for increasing a transient power or torque margin. Additionally or alternatively, the multi-axle system controller 110 may generate or optimize a performance cost function for increasing a power margin at step 352.

At step 354, once the performance cost function is constructed, the multi-axle system controller 110 further optimizes the performance cost function based on axle parameters and power demand of the vehicle to determine an optimal load distribution among motor generators. To do so, the multi-axle system controller 110 determines torque/power requirement for each axle to minimize performance cost function within capability and traction limit of the axle parameters.

At step 358, in some embodiments, the multi-axle system controller 110 may determine whether to engage a lift and/or slide axle to further optimize the performance cost function. For example, the multi-axle system controller 110 may determine whether to engage a lift axle to add additional wheels on the ground by balancing a loss in energy efficiency due to added rolling resistance from the increased tire-road interaction and a gain in slip safety effectiveness.

Additionally or alternatively, at step 360, the multi-axle system controller 110 may determine whether to re-pressurize air bags to shift the center of gravity of the vehicle to further optimize the performance cost function. In such embodiments, a vehicle air bag suspensions system may be co-optimized and co-controlled to improve overall performance and transient lag of the system with larger time constants. By shifting the center of gravity of the vehicle, this can further address low traction on high road grade or slippery surfaces. The dynamic air bag pressure settings may effectively move the payload center of gravity. For example, the multi-axle system controller 110 may tip the payload center of gravity forward by lowering forward air bags and raising rear air bags. This may increase the load on a driven tandem, which increases the overall traction of the vehicle. Alternatively, the multi-axle system controller 110 may tip the payload center of gravity backward by raising the forward air bags and lowering the rear air bags. This may increase the load on a trailer tandem, which increases braking stability of the vehicle. Additionally, this may increase airfoil shape, which increases fuel economy. It should be understood that, if the center of gravity is shifted, the performance cost function is reoptimized based on the updated parameters.

At step 362, based on the traction capability of each axle and the power demand of the vehicle system, the multi-axle system controller 110 may determine an optimal load distribution (e.g., how to split the power demand) among the motor generators 130 to provide the demanded power by optimizing the performance cost function. For example, the performance cost function may be optimized based on the current operating speed of each motor generator 130, the current or future power or torque demand by the vehicle system, the current load distribution among electric axles 140, and the slip limit of each motor generator 130.

To determine an optimal load distribution, the multi-axle system controller 110 determines an optimum torque that can be applied to each motor generator 130 while maximizing the slip safety margin to avoid a chance of wheel slip. This optimization of the performance cost function allows the multi-axle system controller 110 to split the power demand among the motor generators 130 to minimize the total energy consumption/maximize the efficiency while reducing the chance of wheel slip (i.e., maximizing the safety margins). In some embodiments, the multi-axle system controller 110 may have artificial intelligence capabilities that perform machine learning in generating and optimizing power cost functions associated with the performance metrics.

To provide an illustration of this example, and not to limit the disclosure in any way, exemplary efficiency maps for motor generators 710, 720 are shown in FIGS. 7A and 7B. The efficiency map for each motor generator illustrates the maximum efficiency for any speed and torque combination. In this example, the vehicle 100 has two motor generators 130 associated with multiple electric axles 140 of the vehicle system. For simplicity of illustration, each motor generator 130 is associated with one electric axle 140. However, it should be understood that, in some embodiments, the motor generator 130 may be associated with multiple electric axles 140. The performance cost function is optimized to select a point (i.e., a speed and torque combination) on each efficiency map such that the combination of two points provide the torque/power demand of the vehicle system at the given speed.

Additionally, in some embodiments, the performance cost function may be further optimized to provide an optimal load distribution. As shown in FIGS. 7A and 7B, the efficiency map for each motor generator 710, 720 further includes a slip limit plot for each motor generator 712, 722, which indicates the upper limit of motor torque that can be applied to the respective motor generator before one or more wheels of the electric axle 140 associated with the respective motor generator 130 slip. In other words, a vertical distance 714, 724 between a point (i.e., a speed and torque combination) and the slip limit plot 712, 722 on the efficiency map 710, 720 represents a safety margin for the respective motor generator 710, 720. The performance cost function is further optimized to select a point on each efficiency map as far away from the slip limit plot 712, 722 as possible while providing the torque/power demand of the vehicle system at the given speed. In other words, the performance cost function is optimized to maximize the safety margin and efficiency while providing the torque/power demand of the vehicle system.

In response to determining the optimal load distribution among the motor generators 130, the multi-axle system controller 110 communicates with the motor generators 130 to implement the load distribution among the motor generators at step 364.

This flowchart is merely an example, which should not unduly limit the scope of the claims. One of ordinary skill in the art would recognize many variations, alternatives, and modifications.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling operation of a vehicle, the system comprising:
   a plurality of electric axles;
   one or more motor generators associated with one or more of the plurality of electric axles; and
   a multi-axle controller communicatively coupled to the one or more motor generators, the multi-axle controller being configured to execute software to cause the multi-axle controller to:
   calculate a power distribution among the plurality of electric axles by optimizing a performance cost function by:
   detecting whether to engage a lift and/or slide a de and/or re-pressurize air bags to shift a center of gravity of the vehicle to further optimize the performance cost function;
   updating, in response to a detection that the lift and/or slide axle is to be engaged and/or the air bags are to be re-pressurized, the one or more parameters of each electric axle indicating updated capabilities of the respective electric axle that has been lifted, slid, or otherwise altered:
   identifying the torque or power requirement for each electric axle to reduce optimized performance cost function within capability and a traction limit of the updated axle parameters, and
   calculating an optimal load of each motor generator that satisfies a power demand and the performance cost function based at least in part on the torque or power requirement for each electric axle; and
   transmit a traction command to the one or more motor generators to control the operation of the plurality of electric axles.

2. The system of claim 1, wherein the multi-axle controller is further configured to execute software to cause the multi-axle controller to:
   identify one or more parameters of each electric axle of the plurality of electric axles of the vehicle, the one or more parameters indicating capabilities of each electric axle;
   detect current and/or future road grade based at least in part on grade sensor data collected by the vehicle and/or other vehicles and/or navigation system data of a route that the vehicle is travelling;
   calculate the power demand of the vehicle based at least in part on the one or more parameters of each electric axle and the current and/or future road grade; and
   generate the performance cost function associated with the one or more performance metrics, the power demand, and/or the vehicle information.

3. The system of claim 2, wherein the one or more vehicle parameters include a location of each electric axle, a motor generator speed profile of each electric axle, a motor generator torque profile of each electric axle, a motor generator efficiency map of each electric axle, a torque, speed, and/or power limit of each motor generator, a gearing ratio or transmission ratio of each electric axle, a rear axle ratio of each electric axle, and/or inertia characteristics of each electric axle.

4. The system of claim 2, wherein the one or more performance metrics include reducing a total energy consumption of the vehicle, increasing a slip safety margin, increasing a transient torque margin, and increasing power margin.

5. The system of claim 2, wherein the multi-axle controller is further configured to execute software to cause the multi-axle controller to identify vehicle information of the vehicle, wherein the vehicle information includes a total mass of the vehicle, a center of gravity, a load distribution among the plurality of electric axles, and/or a traction limit of each electric axle,
wherein to generate the performance cost function includes to generate the performance cost function associated with one or more performance metrics based at least in part on the one or more parameters of each electric axle, the current and/or future road grade, the power demand, and/or the vehicle information.

6. The system of claim 5, wherein to identify the vehicle information includes to:
detect a total mass of the vehicle and a center of gravity based at least in part on acceleration and acceleration force of the vehicle;
detect a load distribution among the plurality of electric axles based at least in part on a location of each electric axle, the total mass of the vehicle, and the center of gravity; and
calculate a traction limit of each electric axle based at least in part on the total mass of the vehicle, the center of gravity, the load distribution, and/or the current or future road grade, the traction limit indicating a maximum motor torque that can be applied to the respective electric axle before wheel slip is detected.

7. The system of claim 1, wherein to calculate the power distribution among the plurality of electric axles includes to:
identify a torque or power requirement for each electric axle to reduce performance cost function within the capability and a traction limit of the axle parameters; and
calculate an optimal load of each motor generator that satisfies the power demand and the performance cost function based at least in part on the torque or power requirement for each electric axle.

8. A method for controlling a plurality of electric axles of a vehicle, the method comprising:
calculate a power distribution among the plurality of electric axles by optimizing a performance cost function by:
detecting whether to engage a lift and/or slide axle and/or re-pressurize air bags to shift a center of gravity of the vehicle to further optimize the performance cost function;
updating, in response to detecting that the lift and/or slide axle is to be engaged and/or the air bags are to be re-pressurized, the one or more parameters of each electric axle indicating updated capabilities of the respective electric axle that has been lifted slid, or otherwise altered;
identifying the torque or power requirement for each electric axle to reduce optimized performance cost function within capability and a traction limit of the updated axle parameters, and calculating an optimal load of each motor generator that satisfies a power demand and the perform cost function based at least in part on the torque or power requirement for each electric axle; and
transmitting a traction command to one or more motor generators coupled to the plurality of electric axles to control operation of the plurality of electric axles.

9. The method of claim 8, further comprising:
identifying one or more parameters of each electric axle of the plurality of electric axles of the vehicle, the one or more parameters indicating capabilities of each electric axle;
detecting current and/or future road grade based at least in part on grade sensor data collected by the vehicle and/or other vehicles and/or navigation system data of a route that the vehicle is travelling;
calculating the power demand of the vehicle based at least in part on one or more parameters of each electric axle and current and/or future road grade; and
generating the performance cost function associated with the one or more performance metrics, the power demand, and/or the vehicle information.

10. The method of claim 9, wherein the one or more vehicle parameters include a location of each electric axle, a motor generator speed profile of each electric axle, a motor generator torque profile of each electric axle, a motor generator efficiency map of each electric axle, a torque, speed, and/or power limit of each motor generator, a gearing ratio or transmission ratio of each electric axle, a rear axle ratio of each electric axle, and/or inertia characteristics of each electric axle.

11. The method of claim 9, wherein the one or more performance metrics include reducing a total energy consumption of the vehicle, increasing a slip safety margin, increasing a transient torque margin, and increasing power margin.

12. The method of claim 9, further comprising:
identifying vehicle information of the vehicle, wherein the vehicle information includes a total mass of the vehicle, a center of gravity, a load distribution among the plurality of electric axles, and/or a traction limit of each electric axle,
wherein generating the performance cost function includes generating the performance cost function associated with one or more performance metrics based at least in part on the one or more parameters of each electric axle, the current and/or future road grade, the power demand, and/or the vehicle information.

13. The method of claim 12, wherein identifying the vehicle information includes:
detecting a total mass of the vehicle and a center of gravity based at least in part on acceleration and acceleration force of the vehicle;
detecting a load distribution among the plurality of electric axles based at least in part on a location of each electric axle, the total mass of the vehicle, and the center of gravity; and
calculating a traction limit of each electric axle based at least in part on the total mass of the vehicle, the center of gravity, the load distribution, and/or the current or future road grade, the traction limit indicating a maximum motor torque that can be applied to the respective electric axle before wheel slip is detected.

14. The method of claim 8, wherein calculating the power distribution among the plurality of electric axles includes:

identifying a torque or power requirement for each electric axle to reduce performance cost function within capability and a traction limit of the axle parameters; and calculating an optimal load of each motor generator that satisfies the power demand and the performance cost function based at least in part on the torque or power requirement for each electric axle.

15. A multi-axle controller for controlling a plurality of electric axles of a vehicle, the multi-axle controller comprising:

a processor; and a memory storing software which when executed by the processor causes the processor to:

detect a power demand of the vehicle based at least in part on one or more parameters of each electric axle and current and/or future road grade;

generate a performance cost function associated with one or more performance metrics, the power demand, and/or the vehicle information;

calculate a power distribution among the plurality of electric axles by optimizing the performance cost function by, detecting whether to engage a lift and/or slide axle and/or re-pressurize air bags to shift center of gravity of the vehicle to further optimize the performance cost function;

updating, in response to a detection that the lift and/or slide axle is to be engaged and/or the air bags are to be re-pressurized, the one or more parameters of each electric axle indicating updated capabilities of the respective electric axle that has been lined, slid or otherwise altered;

identifying the torque or power requirement for each electric axle to reduce optimized performance cost function within capability and a traction limit of the updated axle parameters; and calculating an optimal load of each motor generator that satisfies the power demand and the performance cost function based at least in part on the torque or power requirement for each electric axle; and transmit a traction command to the one or more motor generators to control the operation of the plurality of electric axles.

16. The multi-axle controller of claim 15, wherein the processor is further caused to:

identify one or more parameters of each electric axle of the plurality of electric axles of the vehicle, the one or more parameters indicating capabilities of each electric axle; and detect current and/or future road grade based at least in part on grade sensor data collected by the vehicle and/or other vehicles and/or navigation system data of a route that the vehicle is travelling.

17. The multi-axle controller of claim 15, wherein to calculate the power distribution among the plurality of electric axles includes to:

identify a torque or power requirement for each electric axle to reduce performance cost function within capability and a traction limit of the axle parameters; and calculate an optimal load of each motor generator that satisfies the power demand and the performance cost function based at least in part on the torque or power requirement for each electric axle.

* * * * *